(12) United States Patent
Alpert et al.

(10) Patent No.: US 11,750,255 B1
(45) Date of Patent: Sep. 5, 2023

(54) BEAMFORMING CALIBRATION

(71) Applicant: QUALCOMM Incorporated, San Diego, CA (US)

(72) Inventors: Reuven Alpert, Givat Ada (IL); Evgeny Levitan, Haifa (IL); Reuven Tweg, Azmon (IL); Ronen Even Zur, Givat Ada (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/841,498

(22) Filed: Jun. 15, 2022

(51) Int. Cl.
*H04B 7/06* (2006.01)
*H04B 17/11* (2015.01)
*H04B 7/0426* (2017.01)
*H04B 7/024* (2017.01)

(52) U.S. Cl.
CPC ........... *H04B 7/0617* (2013.01); *H04B 7/024* (2013.01); *H04B 7/0426* (2013.01); *H04B 17/11* (2015.01)

(58) Field of Classification Search
CPC .... H04B 7/0617; H04B 7/024; H04B 7/0426; H04B 17/11
See application file for complete search history.

(56) References Cited

U.S. PATENT DOCUMENTS

| | | | |
|---|---|---|---|
| 2014/0334564 A1* | 11/2014 | Singh | H04B 7/0413 375/267 |
| 2019/0124585 A1* | 4/2019 | Katabi | H04B 17/30 |
| 2020/0186207 A1* | 6/2020 | Davydov | H04B 7/0469 |

* cited by examiner

*Primary Examiner* — Sung S Ahn
(74) *Attorney, Agent, or Firm* — Arent Fox, LLP

(57) ABSTRACT

A base station includes an array of transceiver chains, each characterized by a bandwidth and including a transmit chain and a receive chain. The base station determines, at each center frequency and sub-bandwidth covering the bandwidth: a first set of interchain transmit gain and phase/delay differences across transmit chains; and a first set of interchain receive gain and phase/delay differences across the receive chains. The base station then determines, in a same manner as the first determining: a second set of inter-chain transmit differences; and a second set of inter-chain receive differences. The base station adjusts each transmit chain by the difference between the second set of inter-chain transmit differences and the first set of inter-chain transmit differences. The base station adjust each receive chain by the difference between the second set of inter-chain receive differences and the first set of inter-chain receive differences.

28 Claims, 11 Drawing Sheets

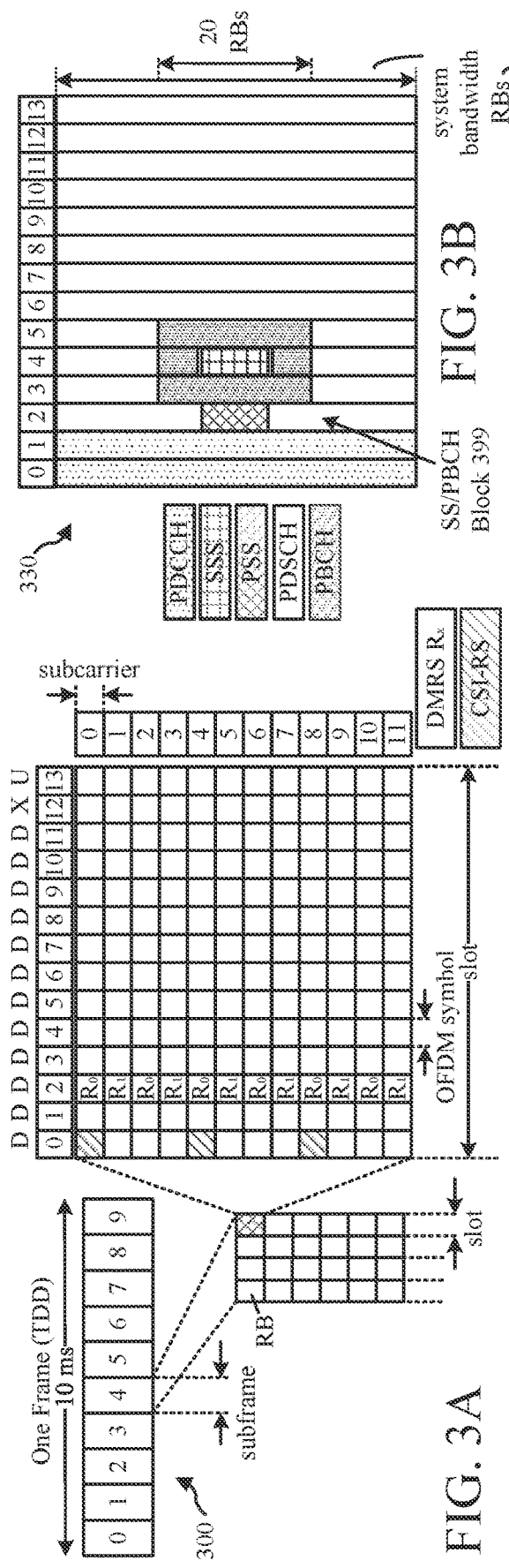
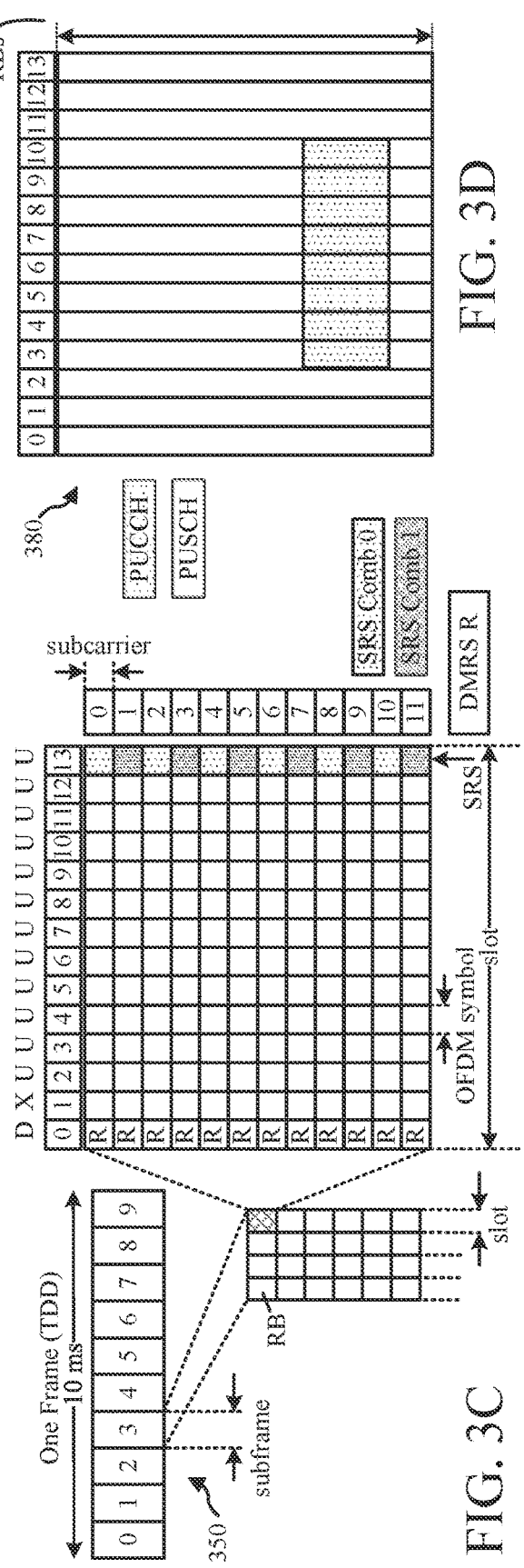

BEAMFORMING CALIBRATION

TECHNICAL FIELD

The present disclosure relates generally to communication systems, and more particularly in some examples, to adjusting beamforming characteristics of transceiver chains associated with antenna arrays in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The technology disclosed herein includes methods, apparatuses, and computer-readable media including instructions for wireless communication. Such technology finds use, for example, in the context of a wireless communication device (such as a base station) that includes an array of transceiver chains. Each transceiver chain is characterized by a bandwidth, and includes a transmit chain and a receive chain. In such technology, the device is used to first determine, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains.

The device is then used to second determine, after the first determining and in a same manner as the first determining: i) a second set of inter-chain transmit gain and phase/delay differences across the transmit chains, and ii) a second set of inter-chain receive gain and phase/delay differences across the receive chains. The device is then used to adjust each transmit chain by the difference between the second set of inter-chain transmit gain and phase/delay differences and the first set of inter-chain transmit gain and phase/delay differences. The device is also used to adjust each receive chain by the difference between the second set of inter-chain receive gain and phase/delay differences and the first set of inter-chain receive gain and phase/delay differences.

In some examples, the first determinations are conducted on a given unit during production to baseline the inter-chain differences in conjunction with a boresight adjustment to the beamforming codebook ("codebook"). A codebook holds the unit chains gain and phase differences per direction, polarization, Tx, Rx, and frequency that, when applied to direct a beam on Rx or on Tx toward a direction. The boresight adjustment can mitigate the effect of silicon variations between the unit used to create the codebook for the given unit. The second determinations are then used to adjust the transceiver chains of the given unit to compensate for time-related changes such as changes due to aging and changes due to temperature variations.

In some examples, the array includes $M \geq 3$ transceiver chains. In such examples, determining a set of inter-chain transmit gain and phase/delay differences across transmit chains comprises, for one or more times sufficient to cover all chains compared to a transmit reference chain $k_1$ includes transmitting from each of a plurality of $N_1 \leq M-1$ chains of the M chains including chain $k_1$ and not including a receive chain $p_{R \times 1}$ of the M chains, a chain-specific signal; first receiving, by the receive chain $p_{R \times 1}$, the transmitted chain-specific signals; and third determining a gain and phase/delay difference between each first received chain-specific signal and the received signal specific to chain $k_1$.

In such examples, determining a set of inter-chain receive gain and phase/delay differences across receive chains comprises, for one or more times sufficient to cover all chains compared to a receive reference chain $k_2$: second transmitting, from a reference transmit chain $p_{T \times 1}$ of the M chains, a reference signal; second receiving, by each of a plurality of $N_2 \leq M-1$ chains of the M chains including chain $k_2$ and not including reference transmit chain $p_{T \times 1}$, each second transmitted reference signal; and fourth determining a gain and phase/delay difference between each second received reference signal and the second received reference signal at chain $k_2$.

In some such examples, the set of chain-specific signals across the plurality of $N_1 \leq M-1$ chains is a set of orthogonal signals. In some such examples, each orthogonal chain-specific signal is a Hadamard signal. In some such examples, transmitting the set of chain-specific signals includes transmitting the set of chain specific signals at a same time.

In some examples, the array is characterized by a beamforming codebook. In such examples, the device is further used, prior to the first determining, to transmit a beam from the device to a test receiver at a far field distance from the device along a first transmit direction. The beam is determined by a first beamforming codebook of the device to transmit the beam in the first transmit direction. The device is then used to adjust a gain and phase difference between the transmit chains to produce maximum received power at the test receiver. The device is then used to determine, for each transmit chain of the device, a transmit gain difference and a transmit phase difference between the beam producing the maximum received power at the test receiver and the beam determined by the first beamforming codebook of the device to transmit at the first transmit direction. Each codebook entry for each transmit direction is then modified with the determined transmit gain difference and the determined transmit phase difference.

Further, the device is used to receive a beam from a test transmitter at a far field distance along a first receive direction using a receive beam determined by the first beamforming codebook of the device to receive at the first receive direction. The device is used to third adjust a gain and phase of the receive chains to produce the maximum received combined power at the device from the test transmitter. The device is then used to second determine, for each receive chain, a receive gain difference and a receive phase difference between the beam producing the maximum received power at the device and the beam determined by the first beamforming codebook of the device to receive at the first receive direction. Finally, the device is used to second modify each codebook entry for each receive direction with the second determined receive gain difference and the second determined receive phase difference. In some such examples, the first transmit direction and the first receive direction are each a boresight direction of the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3A, FIG. 3B, FIG. 3C, and FIG. 3D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
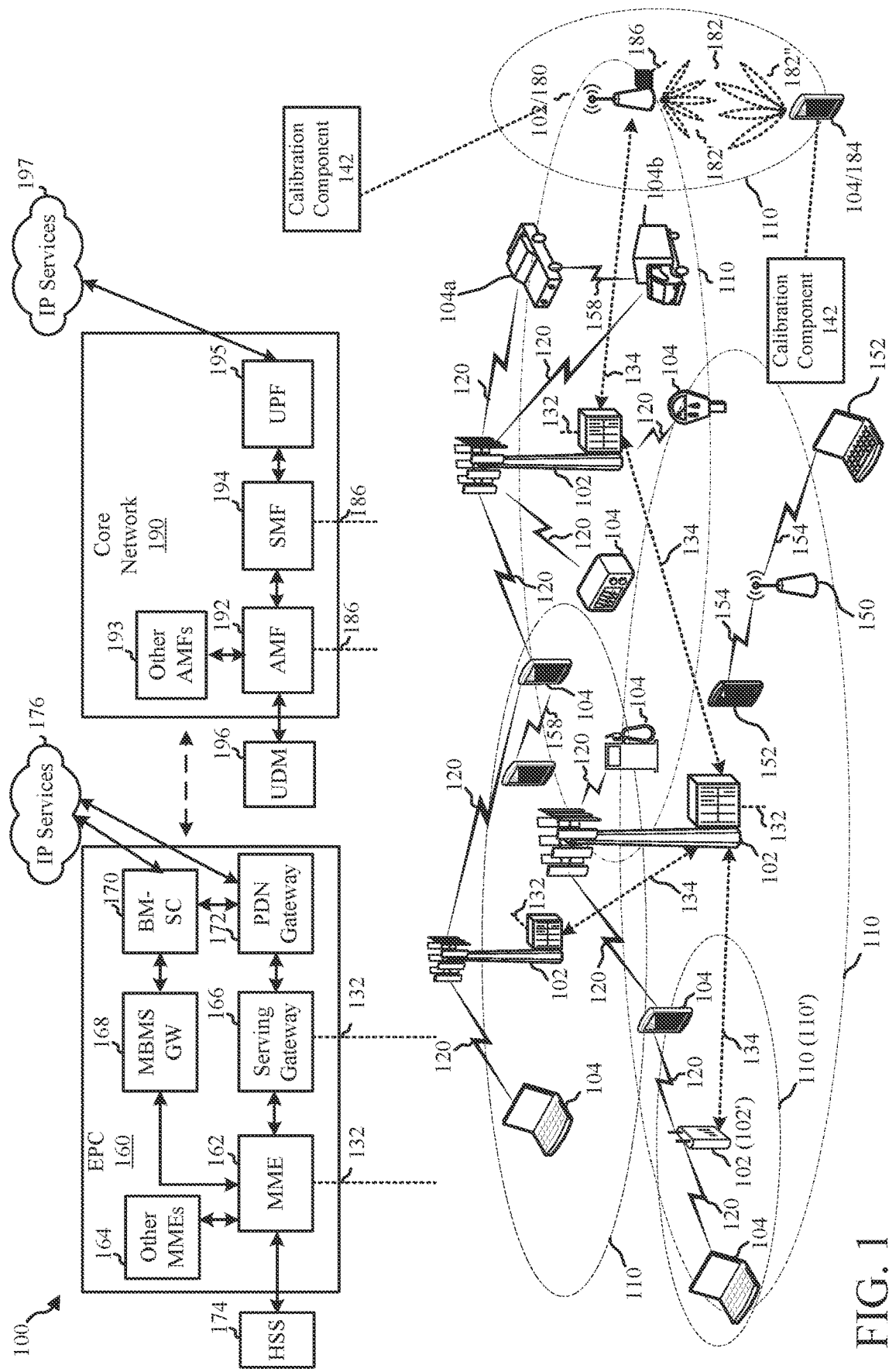
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

5G NR time division duplexed (TDD) base stations may use massive antenna arrays, The antennas in the array connected to a large number of transceivers (Tx/Rx). Each Tx/Rx includes a transmitter and a receiver. Collectively each antenna and its Tx are a "transmit chain," while that antenna and its Rx are a "receive chain."

Some base stations and some UEs implement beamforming (BF) and multi-user multiple input multiple output (MU-MIMO) processing for both transmit (Tx) and receive (Rx). Multi-antenna processing for BF and MU-MIMO typically assumes that the gain, phase, and delay (phase slope over frequency) differences between transceivers are known and constant on both transmit and receive, and across the signal frequency band, silicon variations, and temperature range. In practical implementations, this assumption is not accurate.

For typical BF MU-MIMO devices (e.g., a base station) gain and phase values for pre-defined beams can be held in one or more codebooks—each codebook can be indexed by center frequency, beam direction (e.g., azimuth and elevation with respect to the array) and polarization. Codebook creation may be done once on given unit (e.g., a single base station) for a single silicon variation, at a certain temperature, across the frequency band, and then used for a group of production units. A typical codebook holds phase and gain differences between array elements (e.g., a transmit chain and a receive chain), for difference center frequencies and for Tx and Rx directions that are assumed to be constant.

Typically a codebook based on a single unit is loaded into each of a group of other units of the same type during production. Performance based on a given codebook is known to degrade across units as different silicon variations are used for some units, across time as characteristics of a particular unit change, and across changes in temperature over time. Degradation will be relative to, inter alia, the phase/delay and gain error between transceivers compared to the HW unit used to create and validate the particular codebook.

Examples of the technology disclosed herein allow for Tx/Rx chain calibration to support TDD and FDD BF and MU MIMO. Some examples use calibration slots and over-the-air calibration to avoid added measurement hardware during operation. Calibration slot allocation can be based on open radio access network (O-RAN) specifications or other allocation schemes (e.g., by opportunity). Such examples support full-digital and hybrid (digital+analog) MIMO transceiver. Digital transceiver multiple-antenna systems implement all multi-antenna processing in the digital domain; while hybrid multiple antenna systems implement part of the multi-antenna processing in the analog domain and part in the digital domain.

Some examples of the technology disclosed herein address the measurement and compensation of the gain/phase/delay variations during system operation to allow codebook use of accurate beams on transmit and on receive. Compensation of delay (phase slope over frequency) allows the residual phase compensation to be applied to wider bandwidth, reducing HW complexity, compared to a case where delay compensation is not applied. The residual phase is the phase difference between chains after compensating for the phase response resulting from the delay difference.

The technology disclosed herein includes methods, apparatuses, and computer-readable media including instructions for wireless communication. Such technology finds use, for example, in the context of a wireless communication device (such as a base station) that includes an array of transceiver chains. Each transceiver chain is characterized by a bandwidth, and includes a transmit chain and a receive chain. In such technology, the device is used to first determine, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains. In each case, "inter-chain" refers to between or across chains. Examples herein determine inter-chain differences between a reference chain and each other chain—including mathematical equivalents thereof.

The device is then used to second determine, after the first determining and in a same manner as the first determining: i) a second set of inter-chain transmit gain and phase/delay differences across the transmit chains, and ii) a second set of inter-chain receive gain and phase/delay differences across the receive chains. The device is then used to adjust each transmit chain by the difference between the second set of inter-chain transmit gain and phase/delay differences and the first set of inter-chain transmit gain and phase/delay differences. The device is also used to adjust each receive chain by the difference between the second set of inter-chain receive gain and phase/delay differences and the first set of inter-chain receive gain and phase/delay differences.

In some examples, the first determinations are conducted on a given unit during production to baseline the inter-chain differences in conjunction with a boresight adjustment to the codebook. The boresight adjustment can mitigate the effect of silicon variations between the unit used to create the codebook and the given unit. The second determinations are then used to adjust the transceiver chains of the given unit to compensate for time-related changes such as changes due to aging and changes due to temperature variations.

In some examples, the array includes M≥3 transceiver chains. In such examples, determining a set of inter-chain transmit gain and phase/delay differences across transmit chains includes, for one or more times sufficient to cover all chains compared to a transmit reference chain $k_1$: first transmitting, from each of a plurality of $N_1 \leq M-1$ chains of the M chains including chain $k_1$ and not including a receive chain $p_{R \times 1}$ of the M chains, a chain-specific signal; first receiving, by the receive chain $p_{R \times 1}$, the transmitted chain-specific signals; and third determining a gain and phase/delay difference between each first received chain-specific signal and the received signal specific to chain $k_1$. The medium used for signal propagation between transmitters and receivers could be over the air or through a conducted network design to be part of the device RF hardware.

In such examples, determining a set of inter-chain receive gain and phase/delay differences across receive chains includes, for one or more times sufficient to cover all chains compared to a receive reference chain $k_2$: second transmitting, from a reference transmit chain $p_{T \times 1}$ of the M chains, a reference signal; second receiving, by each of a plurality of $N_2 \leq M-1$ chains of the M chains including chain $k_2$ and not including reference transmit chain $p_{T \times 1}$, each second transmitted reference signal; and fourth determining a gain and phase/delay difference between each second received reference signal and the second received reference signal at chain $k_2$.

In some such examples, the set of chain-specific signals across the plurality of $N_1 \leq M-1$ chains is a set of orthogonal signals. In some such examples, each orthogonal chain-specific signal is a Hadamard signal. In some such examples, transmitting the set of chain-specific signals comprises transmitting the set of chain specific signals at a same time.

In some examples, the array is characterized by a beamforming codebook. In such examples, the device is further used, prior to the first determining, to transmit a beam from the device to a test receiver at a far field distance from the device along a first transmit direction. The beam is determined by a first beamforming codebook of the device to transmit the beam in the first transmit direction. The device is then used to adjust a gain and phase difference between the transmit chains to produce maximum received power at the test receiver. The device is then used to determine, for each transmit chain of the device, a transmit gain difference and a transmit phase difference between the beam producing the maximum received power at the test receiver and the beam determined by the first beamforming codebook of the device to transmit at the first transmit direction. Each codebook entry for each transmit direction is then modified with the determined transmit gain difference and the determined transmit phase difference.

Further, the device is used to receive a beam from a test transmitter at a far field distance along a first receive direction using a receive beam determined by the first beamforming codebook of the device to receive at the first receive direction. The device is used to third adjust a gain and phase of the receive chains to produce the maximum received combined power at the device from the test transmitter. The device is then used to second determine, for each receive chain, a receive gain difference and a receive phase difference between the beam producing the maximum received power at the device and the beam determined by the first beamforming codebook of the device to receive at the first receive direction. Finally, the device is used to second modify each codebook entry for each receive direction with the second determined receive gain difference and the second determined receive phase difference. In some such examples, the first transmit direction and the first receive direction are each a boresight direction of the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 186. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first, second and third backhaul links 132, 186 and 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity.

The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) in communication with Wi-Fi stations (STAs) 152 via communication links 154 in a 5 GHz unlicensed frequency spectrum. When communicating in an unlicensed frequency spectrum, the STAs 152/AP may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in one or more frequency bands within the electromagnetic spectrum. The base station 180 and the UE 104 may each include a plurality of antennas, such as antenna elements, antenna panels, and/or antenna arrays to facilitate the beamforming.

In examples of the technology disclosed herein, the beamforming base station 180 includes an array of transceiver chains. Each transceiver chain is characterized by a bandwidth, and includes a transmit chain and a receive chain. In such technology, the base station 180 is used to first determine, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains. "Sub-bandwidth" refers to divisions, typically non-overlapping, of the bandwidth of the device (not limited to a base station). For example, certain sub-bandwidths are centered at sub-carriers of the device.

The base station 180, using calibration component 142, is then used to second determine, after the first determining and in a same manner as the first determining: i) a second set of inter-chain transmit gain and phase/delay differences across the transmit chains, and ii) a second set of inter-chain receive gain and phase/delay differences across the receive chains. The base station 180 is then used to adjust each transmit chain by the difference between the second set of inter-chain transmit gain and phase/delay differences and the first set of inter-chain transmit gain and phase/delay differences. The base station 180 is also used to adjust each receive chain by the difference between the second set of inter-chain receive gain and phase/delay differences and the first set of inter-chain receive gain and phase/delay differences.

In some examples, the first determinations are conducted on a given base station 180 during production to baseline the inter-chain differences in conjunction with a boresight adjustment to the codebook. The boresight adjustment can mitigate the effect of silicon variations between the unit used to create the codebook and the base station 180. The second determinations are then used to adjust the transceiver chains of the given base station 180 to compensate for time-related changes such as changes due to aging and changes due to temperature variations. The second determinations can be during an O-RAN calibration slot, other scheduled allocations, or during unscheduled/loosely scheduled opportunities.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming with the UE 104/184 to compensate for the path loss and short-range using beams 182.

The base station 180 may transmit a beamformed signal to the UE 104/184 in one or more transmit directions 182'. The UE 104/184 may receive the beamformed signal from the base station 180 in one or more receive directions 182". The UE 104/184 may also transmit a beamformed signal to the base station 180 in one or more transmit directions. The base station 180 may receive the beamformed signal from the UE 104 in one or more receive directions. The base station 180/UE 104/184 may perform beam training to determine the best receive and transmit directions for each of the base station 180/UE 104/184. The transmit and receive directions for the base station 180 may or may not be the same. The transmit and receive directions for the UE 104/184 may or may not be the same. Calibration component 142 can also be included in beamforming UE 184, and operated in the fashion described herein with respect to the beamforming base station 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
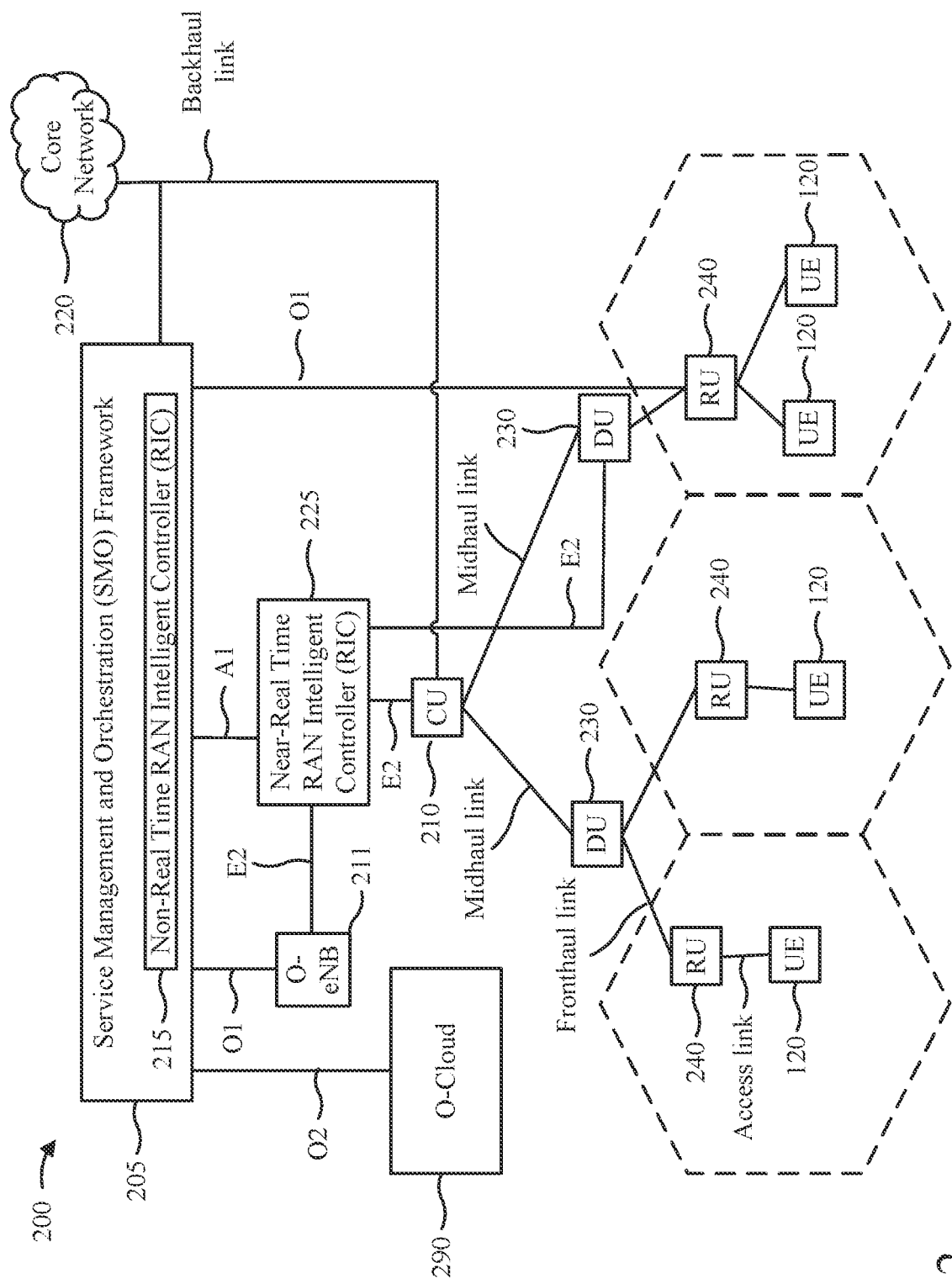
FIG. 2 is a diagram illustrating an example disaggregated base station architecture.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

FIG. 3A is a diagram 300 illustrating an example of a first subframe within a 5G/NR frame structure. FIG. 3B is a diagram 330 illustrating an example of DL channels within a 5G/NR subframe. FIG. 3C is a diagram 350 illustrating an example of a second subframe within a 5G/NR frame structure. FIG. 3D is a diagram 380 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC- FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 3A-3D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS). Some examples of the technology disclosed herein use the DM-RS of the physical downlink control channel (PDCCH) to aid in channel estimation (and eventual demodulation of the user data portions) of the physical downlink shared channel (PDSCH).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK)/negative ACK (NACK) feedback. The PUSCH carries data and may additionally be used to carry a buffer status report (BSR), a power headroom report (PHR), and/or UCI.

Figure 4:
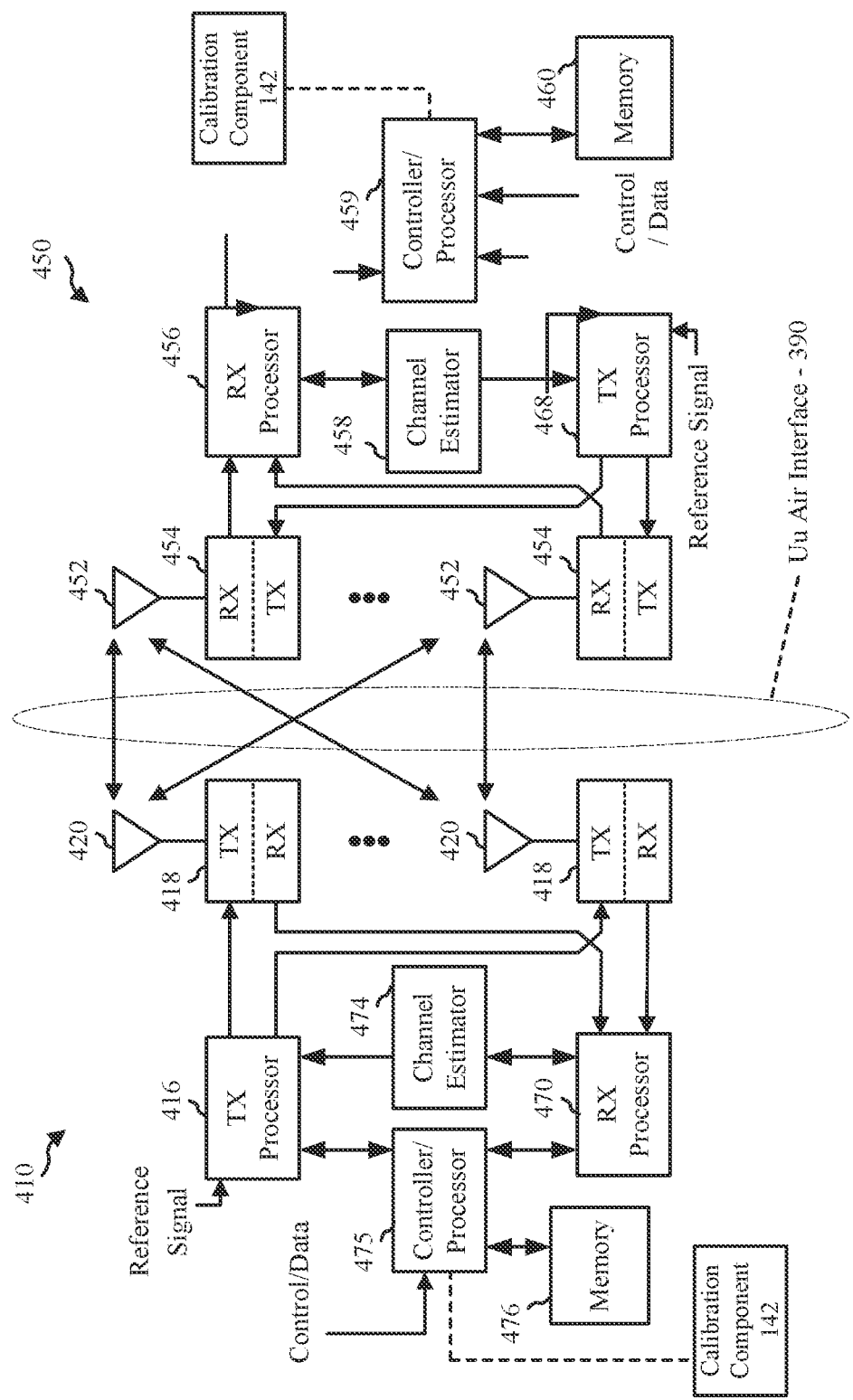
FIG. 4 is a diagram illustrating a base station and user equipment (UE) in an access network, in accordance with examples of the technology disclosed herein.

FIG. 4 is a block diagram of a base station 410 in communication with a UE 450 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate a radio frequency (RF) carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and de-interleaved to recover the data and control signals that were originally transmitted by the base station 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations. As described elsewhere herein, the interface between a UE 450 and a base station 410 can be referred to as a "Uu" interface 490.

Continuing to refer to FIG. 4, and continuing to refer to prior figures for context, in certain aspects, the technology disclosed herein is method, apparatus, and computer-readable media including instructions for wireless communication. Such technology finds use, for example, in the context of a wireless communication device such as a base station 410 that includes an array of transceiver chains, such as transceivers 418 and antennas 420. Each transceiver chain is characterized by a bandwidth, and includes a transmit chain and a receive chain. In such technology, the base station 410 (using base station 410 components described above) is used to first determine, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains.

The base station 410 is then used to second determine, after the first determining and in a same manner as the first determining: i) a second set of inter-chain transmit gain and phase/delay differences across the transmit chains, and ii) a second set of inter-chain receive gain and phase/delay differences across the receive chains. The base station 410 is then used to adjust each transmit chain by the difference between the second set of inter-chain transmit gain and phase/delay differences and the first set of inter-chain transmit gain and phase/delay differences. The base station 410 is also used to adjust each receive chain by the difference between the second set of inter-chain receive gain and phase/delay differences and the first set of inter-chain receive gain and phase/delay differences.

In some examples, the first determinations are conducted on a given base station 410 during production to baseline the inter-chain differences in conjunction with a boresight adjustment to the codebook. The boresight adjustment can mitigate the effect of silicon variations between the unit used to create the codebook and the given base station 410. The second determinations are then used to adjust the transceiver chains of the given base station 410 to compensate for time-related changes such as changes due to aging and changes due to temperature variations.

In some examples, the array is characterized by a beamforming codebook. In such examples, the base station 410 is further used, prior to the first determining, to transmit a beam from the base station 410 to a test receiver at a far field distance from the device along a first transmit direction. The beam is determined by a first beamforming codebook of the base station 410 to transmit the beam in the first transmit direction. The base station 410 is then used to adjust a gain and phase difference between the transmit chains to produce maximum received power at the test receiver. The base station 410 is then used to determine, for each transmit chain of the device, a transmit gain difference and a transmit phase difference between the beam producing the maximum received power at the test receiver and the beam determined by the first beamforming codebook of the base station 410 to transmit at the first transmit direction. Each codebook entry for each transmit direction is then modified with the determined transmit gain difference and the determined transmit phase difference.

Further, the base station 410 is used to receive a beam from a test transmitter at a far field distance along a first receive direction using a receive beam determined by the first beamforming codebook of the device to receive at the first receive direction. The base station 410 is used to third adjust a gain and phase of the receive chains to produce the maximum received combined power at the base station 410 from the test transmitter. The base station 410 is then used to second determine, for each receive chain, a receive gain difference and a receive phase difference between the beam producing the maximum received power at the base station 410 and the beam determined by the first beamforming codebook of the base station 410 to receive at the first receive direction. Finally, the base station 410 is used to second modify each codebook entry for each receive direction with the second determined receive gain difference and the second determined receive phase difference. In some such examples, the first transmit direction and the first receive direction are each a boresight direction of the device.

Calibration component 142 can also be included in beamforming UE 450, and operated in the fashion described herein with respect to the beamforming base station 410.

Figure 5:
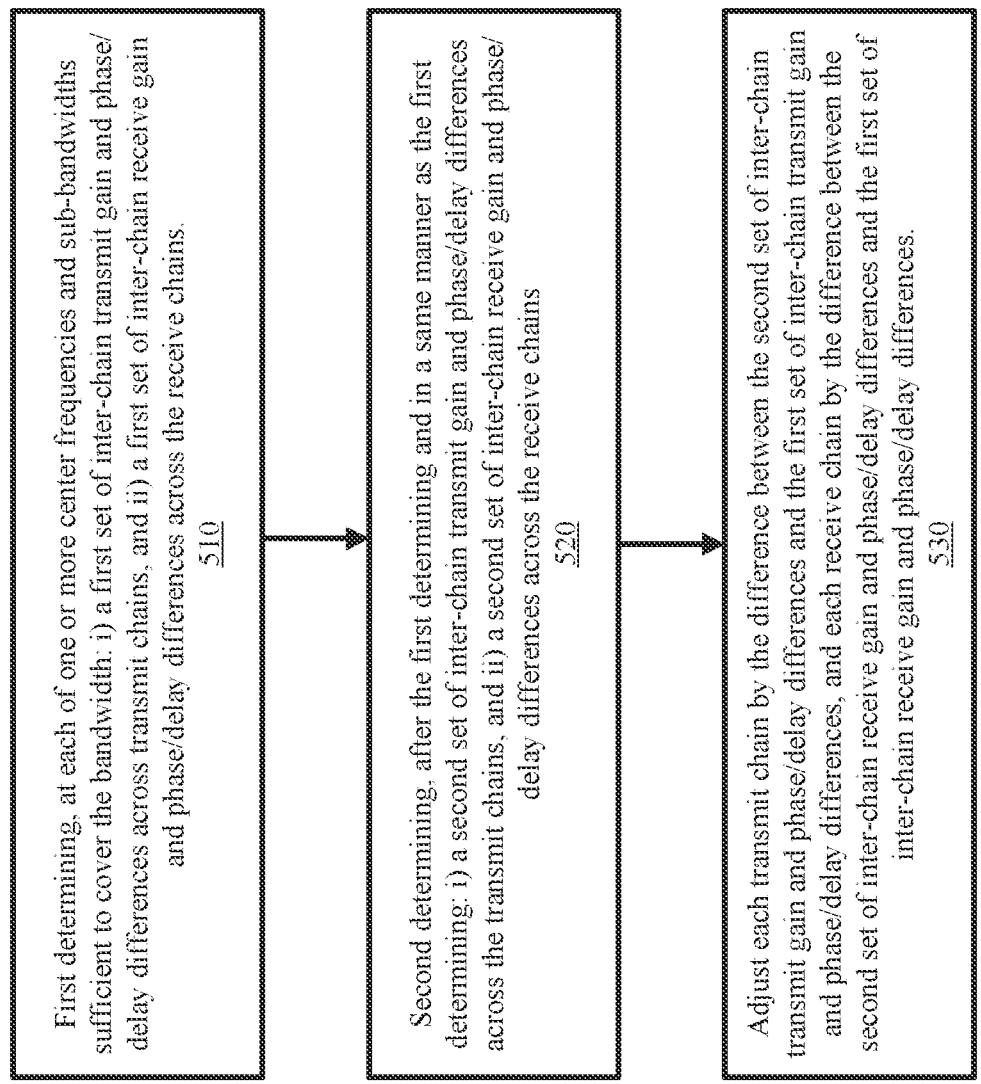
FIG. 5 is a flow diagram illustrating methods of wireless communication, in accordance with examples of the technology disclosed herein.
Figure 7:
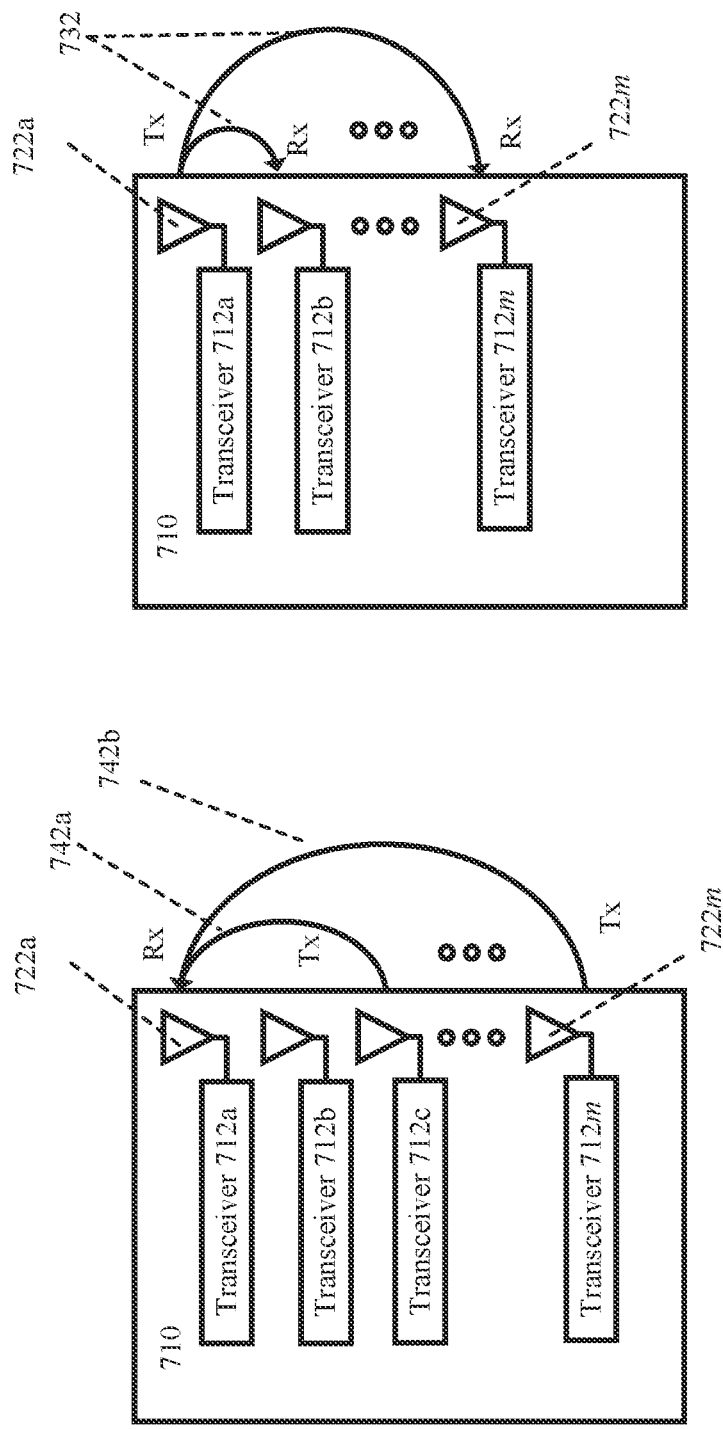
FIG. 7 is a diagram illustrating a device under test in both receive and transmit configuration, in accordance with examples of the technology disclosed herein.

Referring to FIG. 5 and FIG. 7, and continuing to refer to prior figures for context, methods 500 for wireless communication are illustrated, in accordance with examples of the technology disclosed herein. Such technology finds use, for example, in the context of a wireless communication device such as a device 710 that includes an array of transceiver chains including transceiver 712a-transceiver 712m and antenna 722a-antenna 722m. In device 710 each transceiver chain (indicated by letters "a" through "m," and later by consecutive integers starting with "1" for "a") is i) characterized by a bandwidth, and ii) comprises a transmit chain and a receive chain.

In such methods 500, the device first determines, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains—Block 510. For example, device 710 can determine the gain and phase/delay difference between a reference gain and phase/delay and a measured gain and phase/delay for each transceiver chain a-m, allocating one of the transceiver chains as the reference chain, relative to which, gain and phase/delay difference is measured.

Figure 11:
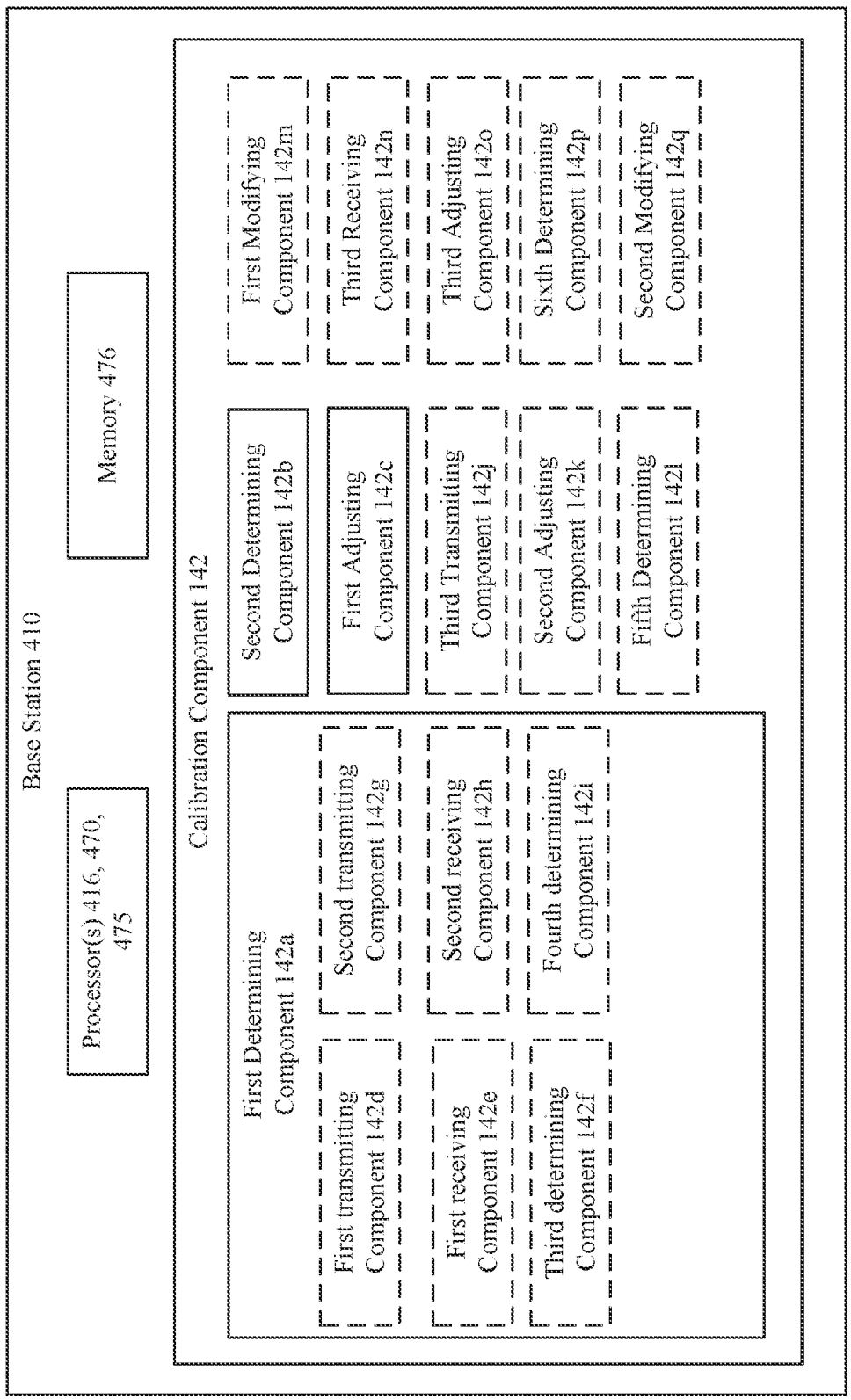
FIG. 11 is a block diagram of a base station, in accordance with examples of the technology disclosed herein.

Referring to FIG. 11, and continuing to refer to prior figures for context, another representation of base station 410 (such as base station 180) for wireless communication of FIG. 4 is shown, in accordance with examples of the technology disclosed herein. Base station 410 includes calibration component 142, controller/processor(s) 416, 470, and 475, along with memory 476, as described in conjunction with FIG. 4 above. Calibration component 142 includes first determining component 142a. In some examples, the first determining component 142a determines, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains. Accordingly, first determining component 142a may provide means for determining, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains.

In such methods 500, the device second determines, after the first determining and in a same manner as the first determining: i) a second set of inter-chain transmit gain and phase/delay differences across the transmit chains, and ii) a second set of inter-chain receive gain and phase/delay differences across the receive chains—Block 520. In a continuing example, the first determinations are conducted on unit 710 during production in order to baseline the inter-chain differences in conjunction with a boresight adjustment to the codebook (described below). The boresight adjustment can mitigate the effect of silicon variations between the unit used to create the codebook and the given unit 710.

Referring again to FIG. 11, calibration component 142 includes second determining component 142b. In some examples, the second determining component 142b second determines, after the first determining and in a same manner as the first determining: i) a second set of inter-chain transmit gain and phase/delay differences across the transmit chains, and ii) a second set of inter-chain receive gain and phase/delay differences across the receive chains. Accordingly, second determining component 142b may provide means for second determining, after the first determining and in a same manner as the first determining: i) a second set of inter-chain transmit gain and phase/delay differences across the transmit chains, and ii) a second set of inter-chain receive gain and phase/delay differences across the receive chains.

In such methods 500, the device first adjusts each transmit chain by the difference between the second set of inter-chain transmit gain and phase/delay differences and the first set of inter-chain transmit gain and phase/delay differences, and each receive chain by the difference between the second set of inter-chain receive gain and phase/delay differences and the first set of inter-chain receive gain and phase/delay differences—Block 530. In the continuing example, the difference between the second determinations and the first determinations are used to adjust the transceiver chains a-m of the unit 710 to compensate for time-related changes such as changes due to aging and changes due to temperature variations.

Referring again to FIG. 11, calibration component 142 includes first adjusting component 142c. In some examples, the first adjusting component 142c first adjusts each transmit chain by the difference between the second set of inter-chain transmit gain and phase/delay differences and the first set of inter-chain transmit gain and phase/delay differences, and each receive chain by the difference between the second set of inter-chain receive gain and phase/delay differences and the first set of inter-chain receive gain and phase/delay differences. Accordingly, first adjusting component 142c may provide means for first adjusting each transmit chain by the difference between the second set of inter-chain transmit gain and phase/delay differences and the first set of inter-chain transmit gain and phase/delay differences, and each receive chain by the difference between the second set of inter-chain receive gain and phase/delay differences and the first set of inter-chain receive gain and phase/delay differences.

Figure 6:
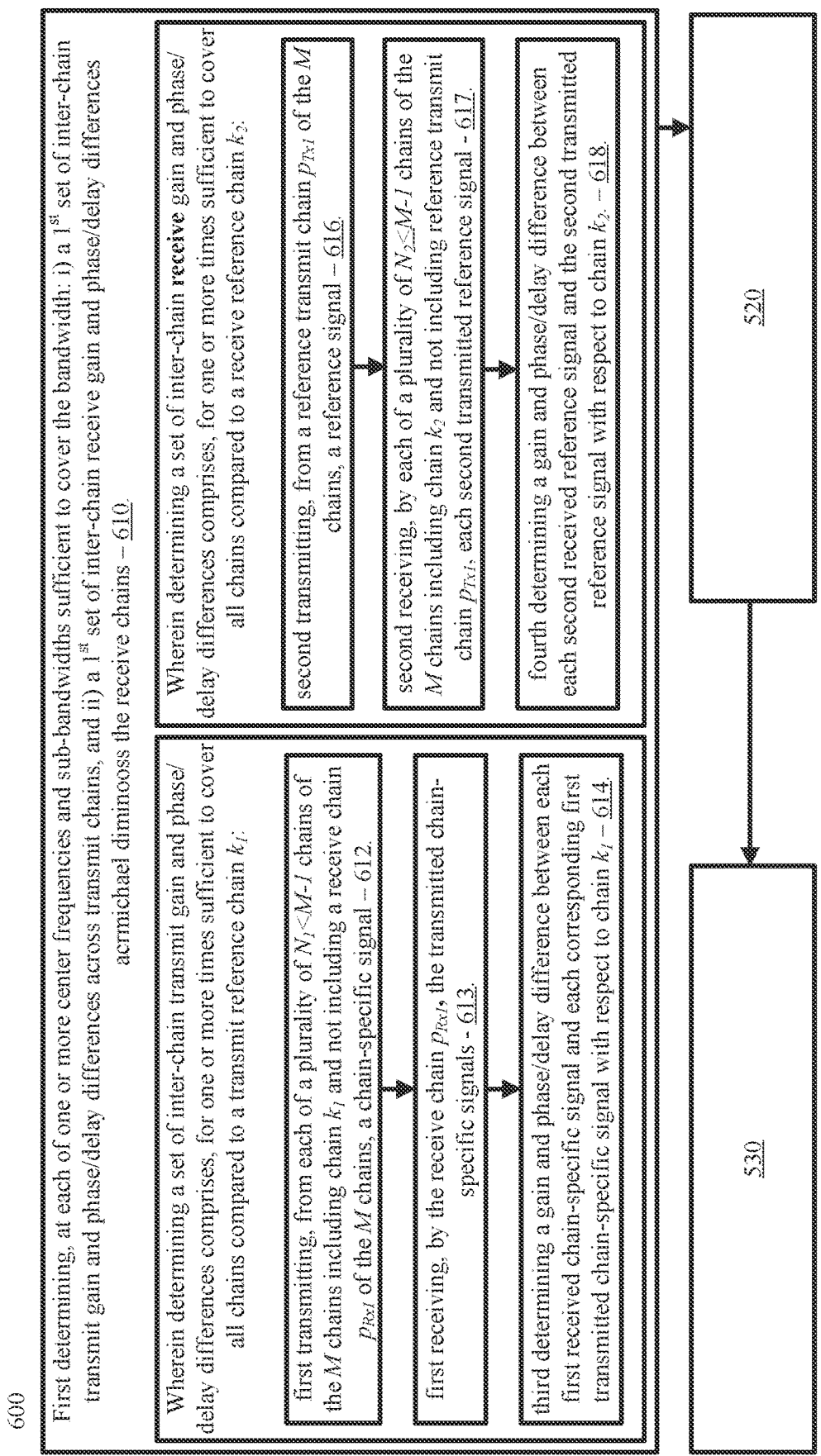
FIG. 6 is a flow diagram illustrating methods of wireless communication, in accordance with examples of the technology disclosed herein.

Referring to FIG. 6 and FIG. 7, and continuing to refer to prior figures for context, example methods 600 for wireless communication are illustrated, in accordance with examples of the technology disclosed herein. Such technology finds use, for example, in the context of a wireless communication device such as a device 710 that includes an array of transceiver chains including transceiver 712a-transceiver 712m and antenna 722a-antenna 722m where M≥3. In such methods 600, Block 520 and Block 530 are performed as described above, mutatis mutandis.

Figure 8:
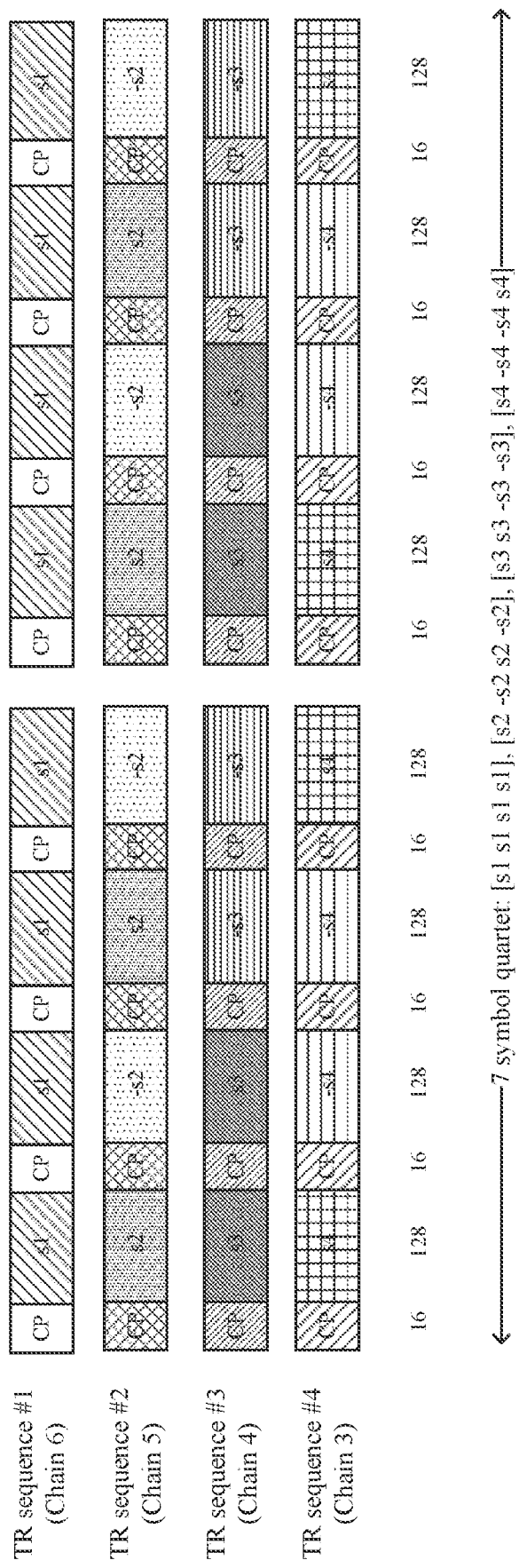
FIG. 8 is a diagram illustrating a signal pattern, in accordance with examples of the technology disclosed herein.

In such methods 600, determining a set of inter-chain transmit gain and phase/delay differences across transmit chains includes, for one or more times sufficient to cover all chains compared to a transmit reference chain $k_1$, first transmitting, from each of a plurality of $N_1 \leq M-1$ chains of the M chains including chain $k_1$ and not including a receive chain $p_{R\times1}$ of the M chains, a chain-specific signal—Block 612. In the continuing example, M=6, the sixth chain (chain-6, referred to herein by using a number corresponding to the lowercase letters used in FIG. 7 and above) is the transmit reference chain $k_1$, and the first chain (chain-1) is the receive chain $p_{R\times1}$, and the transmitting chains are the N=4 chains chain-3 through chain-6 ($k_1$)—as shown in FIG. 7. In the continuing example, the chain-specific signals are a set of four Hadamard orthogonal signals 800 shown schematically in FIG. 8. Unit 710 transmits the signals of FIG. 8 (the signal from chain-6 shown as signal 742b, the signal from chain-3 shown as signal 742a) from the N=4 chains chain-3 through chain-6 ($k_1$), respectively.

Referring again to FIG. 11, calibration component 142 includes first transmitting component 142d. In some examples, the first transmitting component 142d first transmits, from each of a plurality of $N_1 \leq M-1$ chains of the M chains including chain $k_1$ and not including a receive chain $p_{R\times1}$ of the M chains, a chain-specific signal. Accordingly, first transmitting component 142d may provide means for first transmitting, from each of a plurality of $N_1 \leq M-1$ chains of the M chains including chain $k_1$ and not including a receive chain $p_{R\times1}$ of the M chains, a chain-specific signal.

In such methods 600, determining a set of inter-chain transmit gain and phase/delay differences across transmit chains includes, for one or more times sufficient to cover all chains compared to a transmit reference chain $k_1$, first receiving, by the receive chain $p_{R\times1}$, the transmitted chain-specific signals—Block 613. In the continuing example, chain-1 (receive chain $p_{R\times1}$) of unit 710 receives the signals of FIG. 8.

Referring again to FIG. 11, calibration component 142 includes first receiving component 142e. In some examples, the first receiving component 142e first receives, by the receive chain $p_{R\times1}$, the transmitted chain-specific signals. Accordingly first receiving component 142e may provide means for first receiving, by the receive chain $p_{R\times1}$, the transmitted chain-specific signals.

In such methods 600, determining a set of inter-chain transmit gain and phase/delay differences across transmit chains includes, for one or more times sufficient to cover all chains compared to a transmit reference chain $k_1$, third determining a gain and phase/delay difference between each first received chain-specific signal and the received signal specific to chain $k_1$—Block 614. In the continuing example, for each of chain-3, chain-4, and chain-5, the base station unit 710 determines a gain and phase/delay difference with respect to chain-6—with the delay determination being the slope of the phase change across frequencies of the unit 710 bandwidth.

Referring again to FIG. 11, calibration component 142 includes third determining component 142f. In some examples, the third determining component 142f third determines a gain and phase/delay difference between each first received chain-specific signal and the received signal specific to chain $k_1$. Accordingly third determining component 142f may provide means for third determining a gain and phase/delay difference between each first received chain-specific signal and the received signal specific to chain $k_1$.

Notice that this portion of the procedure does not result in determining the transmit gain and phase/delay difference between either chain-1 (receive chain $p_{R\times1}$) and the chain-6 (reference chain $k_1$) or between receive chain-1 (receive chain $p_{R\times1}$) and the reference chain-6 (chain $k_1$). In the continuing example, chain-1 and chain-6 are switched, and a three-signal orthogonal set is transmitted from chain-1, chain-2, and one of the set chain-3, chain-4, and chain-5. This allows measurements to be collected that give the transmit gain and phase/delay difference between both i) chain-1 (receive chain $p_{R\times1}$) and chain-6 (chain $k_1$), and ii) between chain-1 (receive chain $p_{R\times1}$) and chain-6 (chain $k_1$). Whether this portion of the example takes more than one round can be dependent on the number of chain-specific signals that the receive chain $p_{R\times1}$ can resolve at once. In practice, chain-specificity or orthogonality can be achieved over different time slots, different encoding, or a variety of other methods.

In such methods 600, determining a set of inter-chain receive gain and phase/delay differences across receive chains comprises, for one or more times sufficient to cover all chains compared to a receive reference chain $k_2$, second transmitting, from a reference transmit chain $p_{T\times1}$ of the M chains, a reference signal—Block 616. In the continuing example, unit 710 transmits from chain-1 as a reference transmit chain $p_{T\times1}$—as can be seen at transmissions 732a and 732b (same waveform).

Referring again to FIG. 11, calibration component 142 includes second transmitting component 142g. In some examples, the second transmitting component 142g second transmits, from a reference transmit chain $p_{T\times1}$ of the M chains, a reference signal. Accordingly second transmitting component 142g may provide means for second transmitting, from a reference transmit chain $p_{T\times1}$ of the M chains, a reference signal.

In such methods 600, determining a set of inter-chain receive gain and phase/delay differences across receive chains comprises, for one or more times sufficient to cover all chains compared to a receive reference chain $k_2$, second receiving, by each of a plurality of $N_2 \leq M-1$ chains of the M chains including chain $k_2$ and not including reference transmit chain $p_{T\times1}$, each second transmitted reference signal—Block 617. In the continuing example, unit 710 each of chain-2 through chain-5 receives signal 732. As with determining inter-chain transmit gain and phase/delay differences, chain-6 (originally $k_2$) and chain-1 (originally $p_{Tx1}$) can be swapped to determine the chain-1 through chain-6 receive gain and phase/delay difference.

Referring again to FIG. 11, calibration component 142 includes second receiving component 142h. In some examples, the second receiving component 142h second receives, by each of a plurality of $N_2 \leq M-1$ chains of the M chains including chain $k_2$ and not including reference transmit chain $p_{Tx1}$, each second transmitted reference signal. Accordingly second receiving component 142h may provide means for second receiving, by each of a plurality of $N_2 \leq M-1$ chains of the M chains including chain $k_2$ and not including reference transmit chain $p_{Tx1}$, each second transmitted reference signal.

In such methods 600, determining a set of inter-chain receive gain and phase/delay differences across receive chains comprises, for one or more times sufficient to cover all chains compared to a receive reference chain $k_2$, fourth determining a gain and phase/delay difference between each second received reference signal and the second received reference signal at chain $k_2$—Block 618. In the continuing example, for each of chain-2 through chain-6, the unit 710 determines a receive gain and phase/delay difference with respect to chain-6, with the delay determination being the slope of the phase change across frequencies of the unit 710 bandwidth.

As noted above, this portion of the procedure does not result in determining the receive gain and phase/delay difference between chain-1 (transmit chain $p_{Tx1}$) and the chain-6 (reference chain $k_2$). A similar swap of chain-1 and chain-6 allows the receive gain and phase/delay difference between those chains to be determined.

Referring again to FIG. 11, calibration component 142 includes fourth determining component 142i. In some examples, the fourth determining component 142i fourth determines a gain and phase/delay difference between each second received reference signal and the second received reference signal at chain $k_2$. Accordingly fourth determining component 142i may provide means for fourth determining a gain and phase/delay difference between each second received reference signal and the second received reference signal at chain $k_2$.

Figure 9:
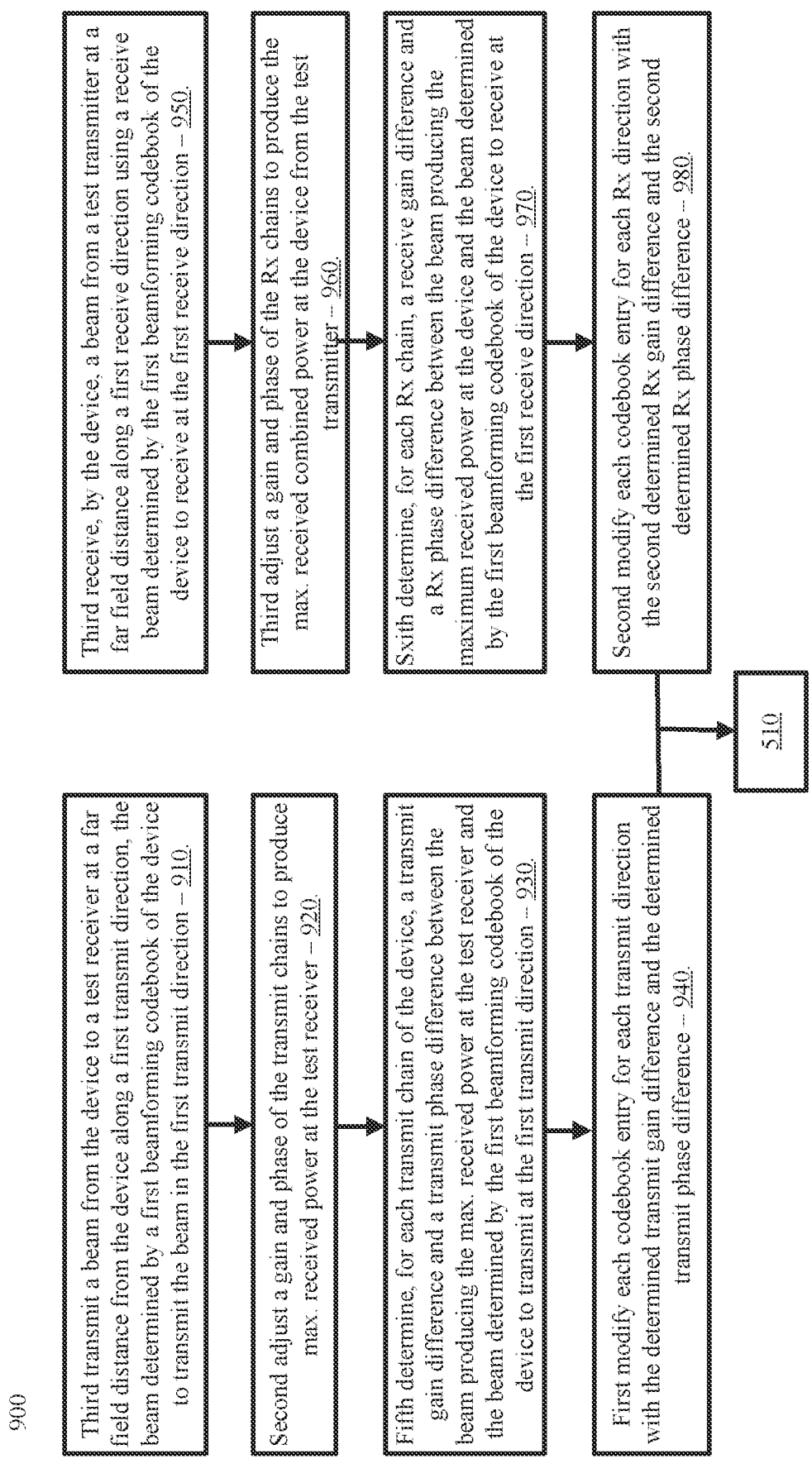
FIG. 9 is a flow diagram illustrating methods of wireless communication, in accordance with examples of the technology disclosed herein.
Figure 10:
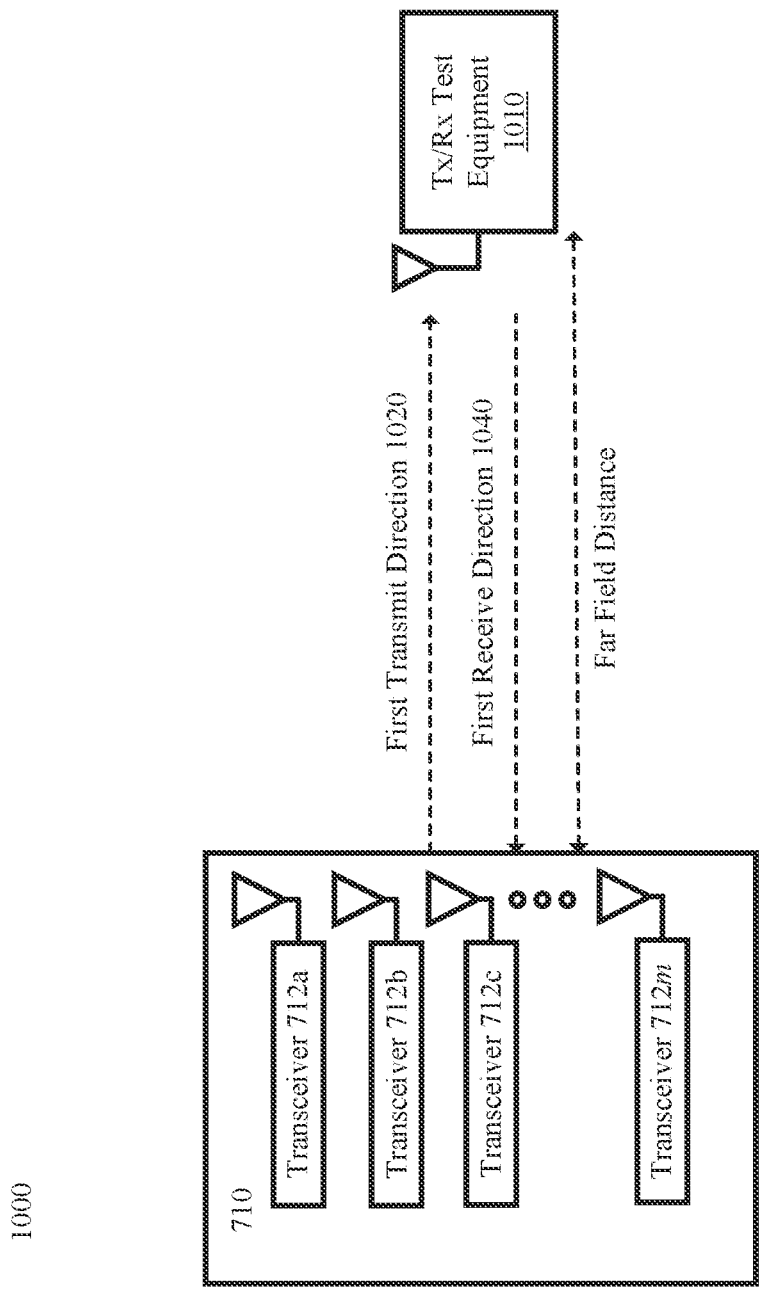
FIG. 10 is a diagram illustrating a device under test, in accordance with examples of the technology disclosed herein.

Referring to FIG. 9 and FIG. 10, and continuing to refer to prior figures for context, example methods 900 for wireless communication are illustrated, in accordance with examples of the technology disclosed herein. Such technology finds use, for example, in the context of a wireless communication device such as a device 710 that includes an array of transceiver chains including transceiver 712a-transceiver 712m and antenna 722a-antenna 722m; and where the array of transceiver chains is characterized by a beamforming codebook. In some such methods 900, the combination of methods described above are performed as described after method 900, e.g., method 900 is performed before Block 510 or Block 610.

In such methods 900, the device third transmits a beam from the device to a test receiver—Block 910. The test receiver 1010 in test setup 1000 is at a far field distance from the device along a first transmit direction 1020. The beam is determined by a first beamforming codebook of the device 710 to transmit the beam in the first transmit direction 1020. In a continuing example, the first transmit direction 1020 is a boresight direction of unit 710, and the transmitting is done in increments of frequency, e.g., at the codebook frequency resolution, to cover the bandwidth of the array.

Referring again to FIG. 11, calibration component 142 includes third transmitting component 142j. In some examples, the third transmitting component 142j third transmits a beam from the device to a test receiver. Accordingly third transmitting component 142j may provide means for third transmitting a beam from the device to a test receiver.

In such methods 900, the device second adjusts a gain and phase of the transmit chains to produce maximum received power at the test receiver—Block 920. In the continuing example, to received power at the test receiver the process starts with pairs of chains, for example 1 and 2, and find the phase that maximizes combined Tx EIRP by sweeping the phase difference between the chains (keeping one chain at constant phase and changing the phase of the other across 0-360 degrees). The process performs the same for amplitude in some range (e.g., +/−3 dB range). After finding gain and phase difference between pairs the process continues to quadrants, changing the gain and phase of second pair versus first pair, and so forth until the number of elements in the array.

Referring again to FIG. 11, calibration component 142 includes second adjusting component 142k. In some examples, the second adjusting component 142k second adjusts a gain and phase of the transmit chains to produce maximum received power at the test receiver. Accordingly second adjusting component 142k may provide means for second adjusting a gain and phase of the transmit chains to produce maximum received power at the test receiver.

In such methods 900, the device fifth determines, for each transmit chain of the device, a transmit gain difference and a transmit phase difference between the beam producing the maximum received power at the test receiver and the beam determined by the first beamforming codebook of the device to transmit at the first transmit direction—Block 930. Referring again to FIG. 11, calibration component 142 includes fifth determining component 142l. In some examples, the fifth determining component 142l fifth determines, for each transmit chain of the device, a transmit gain difference and a transmit phase difference between the beam producing the maximum received power at the test receiver and the beam determined by the first beamforming codebook of the device to transmit at the first transmit direction. Accordingly fifth determining component 142l may provide means for fifth determining, for each transmit chain of the device, a transmit gain difference and a transmit phase difference between the beam producing the maximum received power at the test receiver and the beam determined by the first beamforming codebook of the device to transmit at the first transmit direction.

In such methods 900, the device first modifies each codebook entry for each transmit direction with the determined transmit gain difference and the determined transmit phase difference—Block 940. Referring again to FIG. 11, calibration component 142 includes first modifying component 142m. In some examples, the first modifying component 142m first modifies each codebook entry for each transmit direction with the determined transmit gain difference and the determined transmit phase difference. Accordingly first modifying component 142m may provide means for first modifying each codebook entry for each transmit direction with the determined transmit gain difference and the determined transmit phase difference.

In such methods, on the receive side, the device third receives a beam from a test transmitter—Block 950. The test transmitter 1010 is at a far field distance along a first receive direction 1040 using a receive beam determined by the first beamforming codebook of the device 710 to receive at the first receive direction 1040. Referring again to FIG. 11, calibration component 142 includes third receiving component 142n. In some examples, the third receiving component 142n third receives a beam from a test transmitter. Accordingly third receiving component 142n may provide means for third receiving a beam from a test transmitter.

In such methods, the device third adjusts a gain and phase of the receive chains to produce the maximum received combined power at the device from the test transmitter—Block 960. Referring again to FIG. 11, calibration component 142 includes third adjusting component 142o. In some examples, the third adjusting component 142o third adjusts a gain and phase of the receive chains to produce the maximum received combined power at the device from the test transmitter. Accordingly third adjusting component 142o may provide means for third adjusting a gain and phase of the receive chains to produce the maximum received combined power at the device from the test transmitter.

In such methods, the device sixth determines, for each receive chain, a receive gain difference and a receive phase difference between the beam producing the maximum received power at the device and the beam determined by the first beamforming codebook of the device to receive at the first receive direction—Block 970. Referring again to FIG. 11, calibration component 142 includes sixth determining component 142p. In some examples, the sixth determining component 142p sixth determines, for each receive chain, a receive gain difference and a receive phase difference between the beam producing the maximum received power at the device and the beam determined by the first beamforming codebook of the device to receive at the first receive direction. Accordingly sixth determining component 142p may provide means for sixth determining, for each receive chain, a receive gain difference and a receive phase difference between the beam producing the maximum received power at the device and the beam determined by the first beamforming codebook of the device to receive at the first receive direction.

In such methods, the device second modifies each codebook entry for each receive direction with the second determined receive gain difference and the second determined receive phase difference—Block 980. Referring again to FIG. 11, calibration component 142 includes second modifying component 142q. In some examples, the second modifying component 142q second modifies each codebook entry for each receive direction with the second determined receive gain difference and the second determined receive phase difference. Accordingly second modifying component 142q may provide means for second modifying each codebook entry for each receive direction with the second determined receive gain difference and the second determined receive phase difference.

In practice, in addition to the methods described above, the device uses the channel response between a unit and its peers estimated on reception to calculate the unit transmission precoding. Such processing assumes that the gain/phase/delay differences between unit transceivers are equal on transmit and receive—though this is often not the case. Further examples of the technology disclosed herein perform reciprocity calibration (e.g., for SRS) to measure and compensation for gain/phase/delay difference between transmitter chain and receiver chain.

In such examples, a beamforming device includes an array of at least three transceiver chains. In a three-chain example, the device uses the ith chain (chain-i) as a reference chain to calibrate the jth chain (chain-j) using the kth chain (chain-k)—selecting chain-k according to the chain-j antenna position, e.g., with symmetry to chain-i antenna and to chain j antenna. In practice there can be multiple chain-j.

In such examples, the device transmits a first signal from chain-k to chain-i and to chain j. This transmitted first signal is received at each of chain-i and chain-j. The device then estimates the combined channel response H (including the transmitter, the propagation channel, and each receiver) between i) chain-k and chain-i ($H_{k,i}$), and ii) chain-k and chain-j ($H_{k,j}$) based on the respective received signal.

The device then transmits, from chain-i, a second signal specific to chain-i, and then transmits, from chain-j, a third signal specific to chain-j. Each of the second chain-i signal and third chain-j signals are received at chain-k after propagating. The device then estimates the combined channel response H (between i) chain-i and chain-k ($H_{i,k}$), and ii) chain-j and chain-k ($H_{j,k}$) based on the respective signal received at chain-k. The device adjusts adjusting chain j (on transmit, on receive, or at the modem) by a factor proportional to ($H_{i,k}/H_{j,k}$) ($H_{k,j}/H_{k,i}$). This adjustment can be on transmit, or on receive.

In some such examples, the second signal and the third signal are orthogonal. In some such examples, the second signal and the third signal are transmitted at a same time. In some such examples, the method is performed for all pairwise combinations of Tx/Rx chains of the device.

In some examples, the device transmits, from a transceiver chain (chain-a) other than chain-k, a fourth signal. This transmitted fourth signal is received, at two separate transceiver chains (chain-b and chain-k) of the chains the device other than chain-a. The device estimates a channel response (H) between each of chain-a and chain-b ($H_{a,b}$), and chain-a and chain-k ($H_{a,k}$) based on the respective received signal.

The device also transmits a second signal specific to chain-b from chain-b, and a third signal specific to chain-k transmitting from chain-k. The transmitted second signal (chain-b) and the third signal (chain-k) are received at chain a. The device then estimates a channel response (H) between each of chain-b and chain-a ($H_{b,a}$), and chain-k and chain-a ($H_{k,a}$) based on the respective signal received at chain k. With this information, the device can adjust (on transmit, on receive, or at the modem) chain-k by a factor proportional to ($H_{b,a}/H_{k,a}$)($H_{a,k}/H_{a,b}$).

The following examples are illustrative only and aspects thereof may be combined with aspects of other embodiments or teaching described herein, without limitation. The technology disclosed herein includes method, apparatus, and computer-readable media including instructions for wireless communication. Such technology finds use in the context of a wireless communication device. The device includes an array of transceiver chains, each transceiver chain i) characterized by a bandwidth, and ii) comprising a transmit chain and a receive chain. Such a device can Example 1 includes methods, apparatuses, and computer readable media for wireless communication, in which, the device is used to first determine, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains. The device is then used to second determine, after the first determining and in a same manner as the first determining: i) a second set of inter-chain transmit gain and phase/delay differences across the transmit chains, and ii) a second set of inter-chain receive gain and phase/delay differences across the receive chains. The device is then used to adjust each transmit chain by the difference between the second set of inter-chain transmit gain and phase/delay differences and the first set of inter-chain transmit gain and phase/delay differences. The device is also used to adjust each receive chain by the difference between the second set of inter-chain receive gain and phase/delay differences and the first set of inter-chain receive gain and phase/delay differences.

Example 2 includes Example 1, wherein the first determinations are conducted on a given unit during production to baseline the inter-chain differences in conjunction with a boresight adjustment to the codebook. The boresight adjustment can mitigate the effect of silicon variations between the unit used to create the codebook and the given unit. The second determinations are then used to adjust the transceiver chains of the given unit to compensate for time-related changes such as changes due to aging and changes due to temperature variations.

Example 3 includes any one or more of Example 1-Example 2 wherein the array includes $M \geq 3$ transceiver chains. In such examples, determining a set of inter-chain transmit gain and phase/delay differences across transmit chains comprises, for one or more times sufficient to cover all chains compared to a transmit reference chain $k_1$ includes transmitting from each of a plurality of $N_1 \leq M-1$ chains of the M chains including chain $k_1$ and not including a receive chain $p_{R \times 1}$ of the M chains, a chain-specific signal; first receiving, by the receive chain $p_{R \times 1}$, the transmitted chain-specific signals; and third determining a gain and phase/delay difference between each first received chain-specific signal and the received signal specific to chain $k_1$. In such examples, determining a set of inter-chain receive gain and phase/delay differences across receive chains comprises, for one or more times sufficient to cover all chains compared to a receive reference chain $k_2$: second transmitting, from a reference transmit chain $p_{T \times 1}$ of the M chains, a reference signal; second receiving, by each of a plurality of $N_2 \leq M-1$ chains of the M chains including chain $k_2$ and not including reference transmit chain $p_{T \times 1}$, each second transmitted reference signal; and fourth determining a gain and phase/delay difference between each second received reference signal and the second received reference signal at chain $k_2$.

Example 4 includes any one or more of Example 1-Example 3 wherein, the set of chain-specific signals across the plurality of $N_1 \leq M-1$ chains is a set of orthogonal signals. In some such examples, each orthogonal chain-specific signal is a Hadamard signal. Example 5 includes any one or more of Example 1-Example 4 wherein transmitting the set of chain-specific signals includes transmitting the set of chain specific signals at a same time.

Example 6 includes any one or more of Example 1-Example 5, wherein the array is characterized by a beamforming codebook. In such examples, the device is further used, prior to the first determining, to transmit a beam from the device to a test receiver at a far field distance from the device along a first transmit direction. The beam is determined by a first beamforming codebook of the device to transmit the beam in the first transmit direction. The device is then used to adjust a gain and phase difference between the transmit chains to produce maximum received power at the test receiver. The device is then used to determine, for each transmit chain of the device, a transmit gain difference and a transmit phase difference between the beam producing the maximum received power at the test receiver and the beam determined by the first beamforming codebook of the device to transmit at the first transmit direction. Each codebook entry for each transmit direction is then modified with the determined transmit gain difference and the determined transmit phase difference. Further, the device is used to receive a beam from a test transmitter at a far field distance along a first receive direction using a receive beam determined by the first beamforming codebook of the device to receive at the first receive direction. The device is used to third adjust a gain and phase of the receive chains to produce the maximum received combined power at the device from the test transmitter. The device is then used to second determine, for each receive chain, a receive gain difference and a receive phase difference between the beam producing the maximum received power at the device and the beam determined by the first beamforming codebook of the device to receive at the first receive direction. Finally, the device is used to second modify each codebook entry for each receive direction with the second determined receive gain difference and the second determined receive phase difference. Example 7 includes any one or more of Example 1-Example 6, wherein the first transmit direction and the first receive direction are each a boresight direction of the device.

Example 8 includes any one or more of Example 1-Example 7 wherein a beamforming device includes an array of at least three transceiver chains. In a three-chain example, the device uses the ith chain (chain-i) as a reference chain to calibrate the jth chain (chain-j) using the kth chain (chain-k)—selecting chain-k according to the chain-j antenna position, e.g., with symmetry to chain-i antenna and to chain j antenna. In practice there can be multiple chain-j. In such examples, the device transmits a first signal from chain-k to chain-i and to chain j. This transmitted first signal is received at each of chain-i and chain-j. The device then estimates the combined channel response H (including the transmitter, the propagation channel, and each receiver) between i) chain-k and chain-i ($H_{k,i}$), and ii) chain-k and chain-j ($H_{k,j}$) based on the respective received signal. The device then transmits, from chain-i, a second signal specific to chain-i, and then transmits, from chain-j, a third signal specific to chain-j. Each of the second chain-i signal and third chain-j signals are received at chain-k after propagating. The device then estimates the combined channel response H (between i) chain-i and chain-k ($H_{i,k}$), and ii) chain-j and chain-k ($H_{j,k}$) based on the respective received signal received at chain-k. The device adjusts adjusting chain j (on transmit, on receive, or at the modem) by a factor proportional to $(H_{i,k}/H_{j,k})(H_{k,j}/H_{k,i})$. This adjustment can be on transmit, or on receive.

Example 9 includes any one or more of Example 1-Example 8 wherein the second signal and the third signal are orthogonal. Example 10 includes any one or more of Example 1Example 9 wherein the second signal and the third signal are transmitted at a same time. In some such examples, the method is performed for all pairwise combinations of Tx/Rx chains of the device. Example 11 includes any one or more of Example 1-Example 10 wherein the device transmits, from a transceiver chain (chain-a) other than chain-k, a fourth signal. This transmitted fourth signal is received, at two separate transceiver chains (chain-b and chain-k) of the chains the device other than chain-a. The device estimates a channel response (H) between each of chain-a and chain-b ($H_{a,b}$), and chain-a and chain-k ($H_{a,k}$) based on the respective received signal. The device also transmits a second signal specific to chain-b from chain-b, and a third signal specific to chain-k transmitting from chain-k. The transmitted second signal (chain-b) and the third signal (chain-k) are received at chain a. The device then estimates a channel response (H) between each of chain-b and chain-a ($H_{b,a}$), and chain-k and chain-a ($H_{k,a}$) based on the respective signal received at chain k. With this information, the device can adjust (on transmit, on receive, or at the modem) chain-k by a factor proportional to $(H_{b,a}/H_{k,a})(H_{a,k}/H_{a,b})$.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A method of wireless communication, comprising:
  in a wireless communication device, the device comprising an array of transceiver chains, each transceiver chain i) characterized by a bandwidth, and ii) comprising a transmit chain and a receive chain:
    first determining, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains;
    second determining, after the first determining and in a same manner as the first determining: i) a second set of inter-chain transmit gain and phase/delay differences across the transmit chains, and ii) a second set of inter-chain receive gain and phase/delay differences across the receive chains; and
    first adjusting each transmit chain by the difference between the second set of inter-chain transmit gain and phase/delay differences and the first set of inter-chain transmit gain and phase/delay differences, and each receive chain by the difference between the second set of inter-chain receive gain and phase/delay differences and the first set of inter-chain receive gain and phase/delay differences.

2. The method of claim 1, wherein:
  the array comprises M≥3 transceiver chains;
  determining a set of inter-chain transmit gain and phase/delay differences across transmit chains comprises, for one or more times sufficient to cover all chains compared to a transmit reference chain $k_1$:
    first transmitting, from each of a plurality of $N_1 \leq M-1$ chains of the M chains including chain $k_1$ and not including a receive chain $p_{R \times 1}$ of the M chains, a chain-specific signal;
    first receiving, by the receive chain $p_{R \times 1}$, the transmitted chain-specific signals; and
    third determining a gain and phase/delay difference between each first received chain-specific signal and the received signal specific to chain $k_1$; and
  determining a set of inter-chain receive gain and phase/delay differences across receive chains comprises, for one or more times sufficient to cover all chains compared to a receive reference chain $k_2$:
    second transmitting, from a reference transmit chain $p_{T \times 1}$ of the M chains, a reference signal;
    second receiving, by each of a plurality of $N_2 \leq M-1$ chains of the M chains including chain $k_2$ and not including reference transmit chain $p_{T \times 1}$, each second transmitted reference signal; and
    fourth determining a gain and phase/delay difference between each second received reference signal and the second received reference signal at chain $k_2$.

3. The method of claim 2, wherein the set of chain-specific signals across the plurality of $N_1 \leq M-1$ chains is a set of orthogonal signals.

4. The method of claim 3, wherein each orthogonal chain-specific signal is a Hadamard signal.

5. The method of claim 3, wherein transmitting the set of chain-specific signals comprises transmitting the set of chain specific signals at a same time.

6. The method of claim 1, wherein:
  the array is characterized by a beamforming codebook; and
  further comprising, prior to the first determining:
    third transmitting a beam from the device to a test receiver, the test receiver at a far field distance from the device along a first transmit direction, the beam determined by a first beamforming codebook of the device to transmit the beam in the first transmit direction;
    second adjusting a gain and phase of the transmit chains to produce maximum received power at the test receiver;
    fifth determining, for each transmit chain of the device, a transmit gain difference and a transmit phase difference between the beam producing the maximum received power at the test receiver and the beam determined by the first beamforming codebook of the device to transmit at the first transmit direction;
    first modifying each codebook entry for each transmit direction with the determined transmit gain difference and the determined transmit phase difference;
    third receiving, by the device, a beam from a test transmitter at a far field distance along a first receive direction using a receive beam determined by the first beamforming codebook of the device to receive at the first receive direction;
    third adjusting a gain and phase of the receive chains to produce the maximum received combined power at the device from the test transmitter;

sixth determining, for each receive chain, a receive gain difference and a receive phase difference between the beam producing the maximum received power at the device and the beam determined by the first beamforming codebook of the device to receive at the first receive direction; and second modifying each codebook entry for each receive direction with the second determined receive gain difference and the second determined receive phase difference.

7. The method of claim 6, wherein the first transmit direction and the first receive direction are each a boresight direction of the device.

8. A wireless communication device, comprising:
a memory;
an array of transceiver chains, each transceiver chain i) characterized by a bandwidth, and ii) comprising a transmit chain and a receive chain; and
at least one processor coupled to the memory, the memory including instructions executable by the at least one processor to cause the device to:
first determine, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains;
second determine, after the first determining and in a same manner as the first determining: i) a second set of inter-chain transmit gain and phase/delay differences across the transmit chains, and ii) a second set of inter-chain receive gain and phase/delay differences across the receive chains; and
first adjust each transmit chain by the difference between the second set of inter-chain transmit gain and phase/delay differences and the first set of inter-chain transmit gain and phase/delay differences, and each receive chain by the difference between the second set of inter-chain receive gain and phase/delay differences and the first set of inter-chain receive gain and phase/delay differences.

9. The device of claim 8, wherein:
the array comprises M≥3 transceiver chains;
determining a set of inter-chain transmit gain and phase/delay differences across transmit chains comprises, for one or more times sufficient to cover all chains compared to a transmit reference chain $k_1$:
first transmitting, from each of a plurality of $N_1 \leq M-1$ chains of the M chains including chain $k_1$ and not including a receive chain $p_{R \times 1}$ of the M chains, a chain-specific signal;
first receiving, by the receive chain $p_{R \times 1}$, the transmitted chain-specific signals; and
third determining a gain and phase/delay difference between each first received chain-specific signal and the received signal specific to chain $k_1$; and
determining a set of inter-chain receive gain and phase/delay differences across receive chains comprises, for one or more times sufficient to cover all chains compared to a receive reference chain $k_2$:
second transmitting, from a reference transmit chain $p_{T \times 1}$ of the M chains, a reference signal;
second receiving, by each of a plurality of $N_2 \leq M-1$ chains of the M chains including chain $k_2$ and not including reference transmit chain $p_{T \times 1}$, each second transmitted reference signal; and fourth determining a gain and phase/delay difference between each second received reference signal and the second received reference signal at chain $k_2$.

10. The device of claim 9, wherein the set of chain-specific signals across the plurality of $N_1 \leq M-1$ chains is a set of orthogonal signals.

11. The device of claim 10, wherein each orthogonal chain-specific signal is a Hadamard signal.

12. The device of claim 10, wherein transmitting the set of chain-specific signals comprises transmitting the set of chain specific signals at a same time.

13. The device of claim 8, wherein:
the array is characterized by a beamforming codebook; and
the memory includes further instructions executable by the at least one processor to cause the device to, prior to the first determining:
third transmit a beam from the device to a test receiver, the test receiver at a far field distance from the device along a first transmit direction, the beam determined by a first beamforming codebook of the device to transmit the beam in the first transmit direction;
second adjust a gain and phase of the transmit chains to produce maximum received power at the test receiver;
fifth determine, for each transmit chain of the device, a transmit gain difference and a transmit phase difference between the beam producing the maximum received power at the test receiver and the beam determined by the first beamforming codebook of the device to transmit at the first transmit direction;
first modify each codebook entry for each transmit direction with the determined transmit gain difference and the determined transmit phase difference;
third receive, by the device, a beam from a test transmitter at a far field distance along a first receive direction using a receive beam determined by the first beamforming codebook of the device to receive at the first receive direction;
third adjust a gain and phase of the receive chains to produce the maximum received combined power at the device from the test transmitter;
sixth determine, for each receive chain, a receive gain difference and a receive phase difference between the beam producing the maximum received power at the device and the beam determined by the first beamforming codebook of the device to receive at the first receive direction; and
second modify each codebook entry for each receive direction with the second determined receive gain difference and the second determined receive phase difference.

14. The device of claim 13, wherein the first transmit direction and the first receive direction are each a boresight direction of the device.

15. A non-transitory computer-readable medium storing processor-executable code, the code when read and executed by at least one processor of a wireless communication device, the device comprising an array of transceiver chains, each transceiver chain i) characterized by a bandwidth, and ii) comprising a transmit chain and a receive chain, causes the device to:
first determine, at each of one or more center frequencies and sub-bandwidths sufficient to cover the bandwidth:
i) a first set of inter-chain transmit gain and phase/delay differences across transmit chains, and ii) a first set of inter-chain receive gain and phase/delay differences across the receive chains;

second determine, after the first determining and in a same manner as the first determining: i) a second set of inter-chain transmit gain and phase/delay differences across the transmit chains, and ii) a second set of inter-chain receive gain and phase/delay differences across the receive chains; and first adjust each transmit chain by the difference between the second set of inter-chain transmit gain and phase/delay differences and the first set of inter-chain transmit gain and phase/delay differences, and each receive chain by the difference between the second set of inter-chain receive gain and phase/delay differences and the first set of inter-chain receive gain and phase/delay differences.

16. The non-transitory computer-readable medium of claim 15, wherein:

the array comprises M≥3 transceiver chains;

determining a set of inter-chain transmit gain and phase/delay differences across transmit chains comprises, for one or more times sufficient to cover all chains compared to a transmit reference chain $k_1$:

first transmitting, from each of a plurality of $N_1 \leq M-1$ chains of the M chains including chain $k_1$ and not including a receive chain $p_{R \times 1}$ of the M chains, a chain-specific signal;

first receiving, by the receive chain $p_{R \times 1}$, the transmitted chain-specific signals; and third determining a gain and phase/delay difference between each first received chain-specific signal and the received signal specific to chain $k_1$; and determining a set of inter-chain receive gain and phase/delay differences across receive chains comprises, for one or more times sufficient to cover all chains compared to a receive reference chain $k_2$:

second transmitting, from a reference transmit chain $p_{T \times 1}$ of the M chains, a reference signal;

second receiving, by each of a plurality of $N_2 \leq M-1$ chains of the M chains including chain $k_2$ and not including reference transmit chain $p_{T \times 1}$, each second transmitted reference signal; and fourth determining a gain and phase/delay difference between each second received reference signal and the second received reference signal at chain $k_2$.

17. The non-transitory computer-readable medium of claim 16, wherein the set of chain-specific signals across the plurality of $N_1 \leq M-1$ chains is a set of orthogonal signals.

18. The non-transitory computer-readable medium of claim 17, wherein each orthogonal chain-specific signal is a Hadamard signal.

19. The non-transitory computer-readable medium of claim 17, wherein transmitting the set of chain-specific signals comprises transmitting the set of chain specific signals at a same time.

20. The non-transitory computer-readable medium of claim 15, wherein:

the array is characterized by a beamforming codebook; and the code when read and executed by at least one processor of the device, further causes the device to:

third transmit a beam from the device to a test receiver, the test receiver at a far field distance from the device along a first transmit direction, the beam determined by a first beamforming codebook of the device to transmit the beam in the first transmit direction;

second adjust a gain and phase of the transmit chains to produce maximum received power at the test receiver;

fifth determine, for each transmit chain of the device, a transmit gain difference and a transmit phase difference between the beam producing the maximum received power at the test receiver and the beam determined by the first beamforming codebook of the device to transmit at the first transmit direction;

first modify each codebook entry for each transmit direction with the determined transmit gain difference and the determined transmit phase difference;

third receive, by the device, a beam from a test transmitter at a far field distance along a first receive direction using a receive beam determined by the first beamforming codebook of the device to receive at the first receive direction;

third adjust a gain and phase of the receive chains to produce the maximum received combined power at the device from the test transmitter;

sixth determine, for each receive chain, a receive gain difference and a receive phase difference between the beam producing the maximum received power at the device and the beam determined by the first beamforming codebook of the device to receive at the first receive direction; and second modify each codebook entry for each receive direction with the second determined receive gain difference and the second determined receive phase difference.

21. The non-transitory computer-readable medium of claim 20, wherein the first transmit direction and the first receive direction are each a boresight direction of the device.

22. An apparatus for wireless communications, comprising:

an array of transceiver chains, each transceiver chain i) characterized by a bandwidth, and ii) comprising a transmit chain and a receive chain:

means for first determining, at each of one or more center frequencies and sub-bandwidths sufficient to cover the bandwidth: i) a first set of inter-chain transmit gain and phase/delay differences across transmit chains, and ii) a first set of inter-chain receive gain and phase/delay differences across the receive chains;

means for second determining, after the first determining and in a same manner as the first determining: i) a second set of inter-chain transmit gain and phase/delay differences across the transmit chains, and ii) a second set of inter-chain receive gain and phase/delay differences across the receive chains; and means for first adjusting each transmit chain by the difference between the second set of inter-chain transmit gain and phase/delay differences and the first set of inter-chain transmit gain and phase/delay differences, and each receive chain by the difference between the second set of inter-chain receive gain and phase/delay differences and the first set of inter-chain receive gain and phase/delay differences.

23. The apparatus of claim 22, wherein:

the array comprises M≥3 transceiver chains;

means for determining a set of inter-chain transmit gain and phase/delay differences across transmit chains comprises, for one or more times sufficient to cover all chains compared to a transmit reference chain $k_1$:

means for first transmitting, from each of a plurality of $N_1 \leq M-1$ chains of the M chains including chain $k_1$ and not including a receive chain $p_{R\times 1}$ of the M chains, a chain-specific signal;

means for first receiving, by the receive chain $p_{R\times 1}$, the transmitted chain-specific signals; and means for third determining a gain and phase/delay difference between each first received chain-specific signal and the received signal specific to chain $k_1$; and means for determining a set of inter-chain receive gain and phase/delay differences across receive chains comprises, for one or more times sufficient to cover all chains compared to a receive reference chain $k_2$:

means for second transmitting, from a reference transmit chain $p_{T\times 1}$ of the M chains, a reference signal;

means for second receiving, by each of a plurality of $N_2 \leq M-1$ chains of the M chains including chain $k_2$ and not including reference transmit chain $p_{T\times 1}$, each second transmitted reference signal; and means for fourth determining a gain and phase/delay difference between each second received reference signal and the second received reference signal at chain $k_2$.

24. The apparatus of claim 23, wherein the set of chain-specific signals across the plurality of $N_1 \leq M-1$ chains is a set of orthogonal signals.

25. The apparatus of claim 24, wherein each orthogonal chain-specific signal is a Hadamard signal.

26. The apparatus of claim 24, wherein means for transmitting the set of chain-specific signals comprises means for transmitting the set of chain specific signals at a same time.

27. The apparatus of claim 22, wherein:

the array is characterized by a beamforming codebook; and the apparatus further comprises:

means for third transmitting, prior to the first determining, a beam from the apparatus to a test receiver, the test receiver at a far field distance from the apparatus along a first transmit direction, the beam determined by a first beamforming codebook of the apparatus to transmit the beam in the first transmit direction;

means for second adjusting a gain and phase of the transmit chains to produce maximum received power at the test receiver;

means for fifth determining, for each transmit chain of the apparatus, a transmit gain difference and a transmit phase difference between the beam producing the maximum received power at the test receiver and the beam determined by the first beamforming codebook of the apparatus to transmit at the first transmit direction;

means for first modifying each codebook entry for each transmit direction with the determined transmit gain difference and the determined transmit phase difference;

means for third receiving, by the apparatus, a beam from a test transmitter at a far field distance along a first receive direction using a receive beam determined by the first beamforming codebook of the apparatus to receive at the first receive direction;

means for third adjusting a gain and phase of the receive chains to produce the maximum received combined power at the apparatus from the test transmitter;

means for sixth determining, for each receive chain, a receive gain difference and a receive phase difference between the beam producing the maximum received power at the apparatus and the beam determined by the first beamforming codebook of the apparatus to receive at the first receive direction; and means for second modifying each codebook entry for each receive direction with the second determined receive gain difference and the second determined receive phase difference.

28. The apparatus of claim 27, wherein the first transmit direction and the first receive direction are each a boresight direction of the apparatus.

* * * * *